May 10, 1960 G. DESSAUER 2,936,274
DETERMINATION OF SPECIFIC NEUTRONIC REACTIVITY
Filed Dec. 12, 1956 2 Sheets-Sheet 1
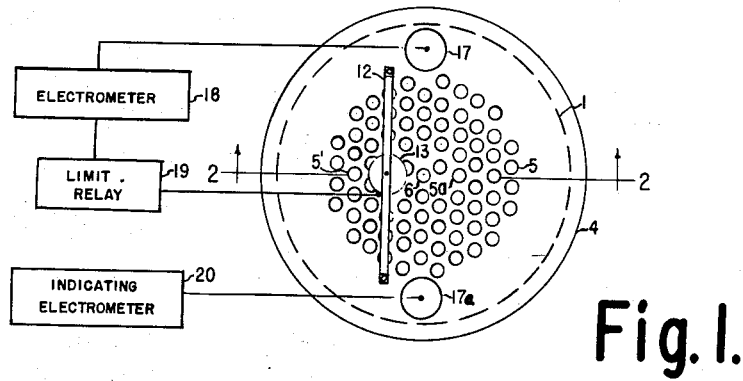
Fig. I.
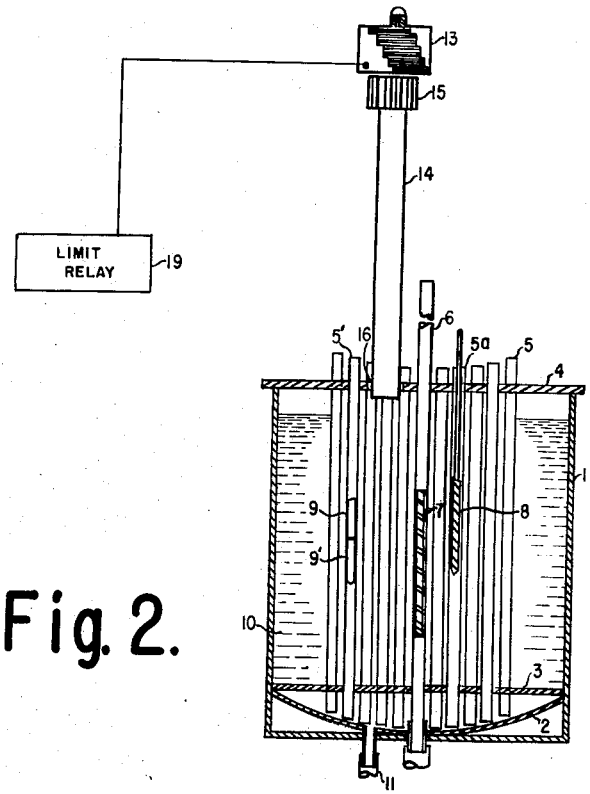
Fig. 2.
INVENTOR.
Gerhard Dessauer
BY
Roland A. Anderson
Attorney May 10, 1960    G. DESSAUER    2,936,274
DETERMINATION OF SPECIFIC NEUTRONIC REACTIVITY
Filed Dec. 12, 1956    2 Sheets-Sheet 2

INVENTOR.
Gerhard Dessauer
BY

United States Patent Office 2,936,274
Patented May 10, 1960

2,936,274
DETERMINATION OF SPECIFIC NEUTRONIC REACTIVITY

Gerhard Dessauer, Aiken, S.C., assignor to the United States of America as represented by the United States Atomic Energy Commission Application December 12, 1956, Serial No. 627,965

4 Claims. (Cl. 204—154.2)

This invention relates in general to neutronic reaction, and more particularly to a new and improved method for rapid quantitative determination of the specific neutronic reactivity of an object.

Heterogeneous neutronic reactors often comprise large numbers of nominally identical fuel elements, control elements, and the like, frequently requiring periodic replacement. Despite nominal identity, such elements are ordinarily subject to myriad possible variations in composition which cumulatively affect the resulting specific neutronic reactivity of each element in a manner quite complex. By specific neutronic reactivity is meant the relative quantitative rate of reaction of the overall element in absorbing and/or generating neutrons upon bombardment with neutrons. Preparatory to charging reactors with such elements it becomes desirable, therefore, to determine directly the specific neutronic reactivity of each of at least a sampled proportion, so as to enable appropriate adjustments in respective location within the reactor and rejection of any that exceed adopted nuclear tolerances.

However, making the determination in the previously-conventional fashion of inserting the test object in a self-sustaining chain fission reactor and observing the kinetic behavior of the neutron flux has proven inordinately time-consuming for routine production-line inspection service. Such measurement of the resulting pile period—by repetitive timed observations of the flux level—generally takes so long as fifteen minutes for each specimen, inasmuch as safety considerations oblige operation with an ascending pile period of typically not less than ten seconds, where delayed neutrons predominate in governing the indicative kinetic behavior.

One object of the present invention is to provide such a method for determining specific neutronic reactivity much more rapidly than with conventional procedures, particularly through suppressing and circumventing the dilatory effects of delayed neutrons.

Another object is to provide such a procedure with retention of the customary high levels of analytical precision.

A further object is to afford exceptional simplicity and safety particularly by avoiding such a complex of safety devices, radiation shielding, and control instrumentation as normally characterizes self-sustaining neutronic reactor operation.

Still another object is to provide such a method adapted to repetitive operation suitable for routine inspection service upon a continuing flow of a large number of specimens, such as for product gaging in reactor component manufacturing.

Still a further object is to provide such a method affording exceptional economy of capital investment, operating cost, and necessary fissionable material inventory.

Yet another object is to provide such a method readily adapted to determine the reactivity of elongated specimens, and even of selected increments thereof, without restriction as to length.

Additional objects will become apparent hereinafter.

In accordance with the present invention, a new and improved method comprises inserting the specimen in a subcritical thermal-neutron-induced chain fission reactive assembly sustained by a constant source of neutrons and detecting the consequent stable thermal neutron flux level at a remote situs in the assembly. Such observation of the static, rather than the kinetic, behavior of flux fundamentally eludes the dilatory effects of the delayed neutrons, except for an initial flux transient. Further, respecting that transient, applicant has found that operating substantially within the narrow range of effective multiplication constants between 0.95 and 0.995, with the specimen inserted, propitiously provides multiplication low enough that the initial transient will damp out in a matter of seconds, and at the same time high enough to assure analytical sensitivity on a par with that customary in previous resort to a self-sustaining reactor.

While the quantitative value of the specific neutronic reactivity could normally be computed in straightforward fashion from the resulting remote flux indication along with the significant parameters defining the system, it is ordinarily simpler to evaluate the indication upon the basis of an initial calibration of the subcritical assembly with similarly sized and shaped samples of known composition. This is especially preferable for measuring a continuing procession of nominally identical elements. Thus, for uranium fuel element specimens, it is convenient to calibrate in terms of "grams of uranium-235" content of a standard fuel element of the same design. Evaluation in such terms affords a direct measure of the effective nuclear worth of the overall speciment for the pertinent reactor fuel service. In like fashion, for fissionable-material-free specimens, the calibration may profitably be in terms of equivalent content of cadmium or other selected neutron absorber.

Two different subcritical assemblies adopted to performance of the present method are illustrated in the appended drawings.

In the drawings, Fig. 1 is a general plan view, schematic in part, of such a subcritical assembly of simple design.

Fig. 2 is a longitudinal sectional elevation, likewise schematic in part, of the assembly shown in Fig. 1.

Figure 3:
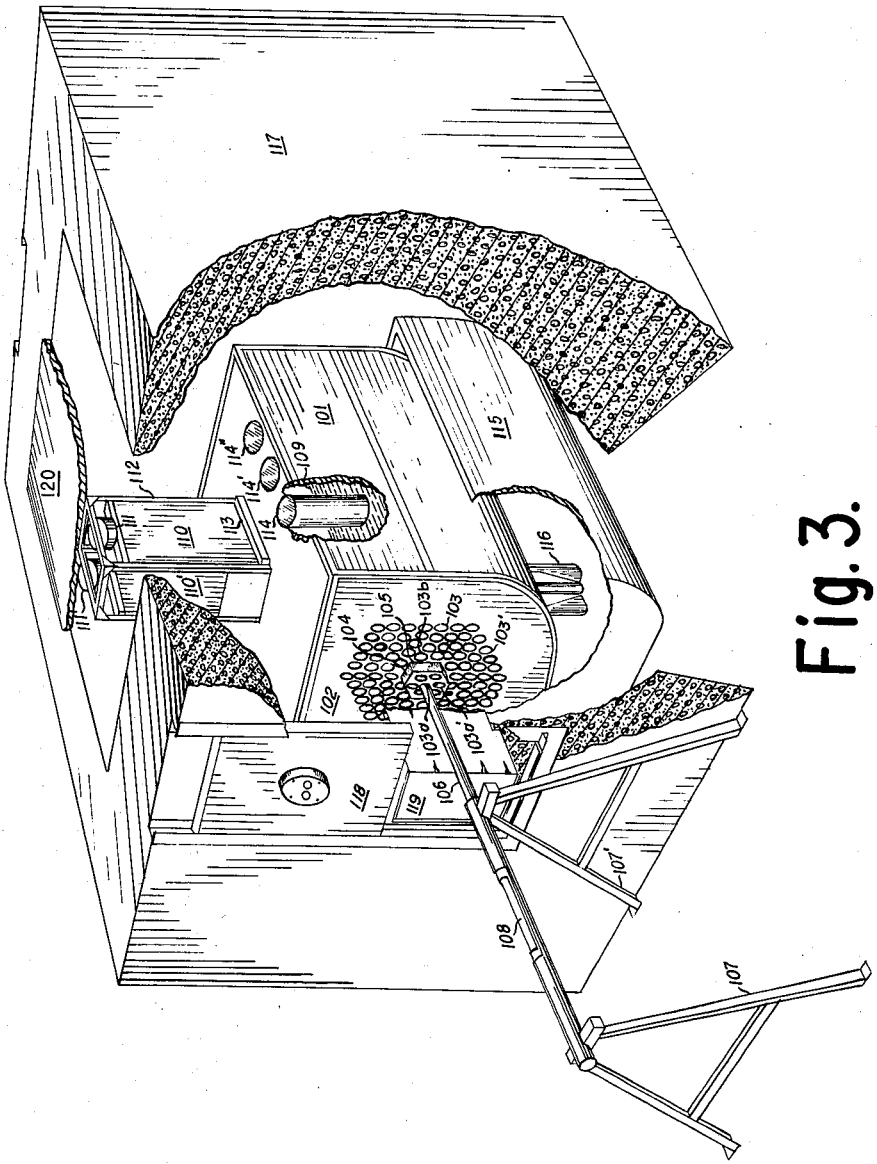
Fig. 3 is a diagrammatic and schematic perspective view, partially cut-away and in cross-section, of a subcritical assembly of more advanced design engineered for production-line application.

Referring to Figs. 1 and 2, an upright, right-cylindrically-walled tank 1, provided with an integral convexly dished bottom 2, serves as the container for the assembly. A lower horizontal planar tube sheet 3, disposed in said tank 1, as a false bottom, and an upper horizontal planar tube sheet 4, mounted as a cover across the top of the tank, support a bundle of spaced, vertical, open-topped cylindrical tubes 5, 5', in triangular array and of a generally hexagonal periphery. In the central portion of the bundle a vertical sleeve 6, open at both ends and extending from both the cover 4, and bottom 2, of the tank, is provided to contain a specimen 7, within the confines of the tank. A special tube 5a, of said bundle of tubes 5, 5', also near the center of the bundle, accommodates a removable strong neutron source (e.g. poloniumberyllium) 8. The remaining tubes, e.g. 5, 5', are adapted to contain alterable quantities of removable solid right cylindrical fuel slugs 9, 9', comprising aluminum-canned aluminum alloy of uranium isotopically enriched in uranium-235. The tank 1, is adapted to be filled with a body of ordinary water 10, for permeating the interstices of the tube bundle to serve as neutron moderant; a pipe 11, is provided in the convex bottom 2, to facilitate introducing and occasionally draining the water. A superstructure frame 12, mounted upon the cover 4, stationarily supports an electromagnet 13, overhanging a portion of the tube bundle. Releasably suspended from the electromagnet 13, an elongated safety blade 14, comprising a thin cadmium sheet protectively sandwiched between a pair of brass plates and topped by a ferromagnetic cap 15, depends into a slot 16, in the cover 4; the downward projection of the area of the slot 16, represents a substantially unobstructed vertical channel extending into the heart of the bundle, down to the false bottom 3. Two separate elongated boron-lined ionization chambers 17, 17a, are disposed vertically withing the tank 1, generally co-extensive with, and near the periphery of, the bundle for sensing instantaneous neutron flux level. To the first ionization chamber 17, is electrically connected in responsive relationship an electrometer 18, adapted to actuate a limit relay 19, in on-off fashion, so as to de-energize the electromagnet 13, whenever the neutron flux sensed by that first ionization chamber 17, exceeds a pre-set maximum tolerable level for safety. The second ionization chamber 17a, is electrically connected, likewise in responsive relationship, to an indicating electrometer 20.

In operation for precisely assessing the specific reactivity of a specimen, the quantity of removable fuel slugs 9, 9', is adjusted to afford, together with the specimen, a neutron multiplication constant substantially within the range of 0.95 and 0.995. Then with the neutron source 8, in place, and the tank 1, filled with the body of water moderant 10, the specimen 7, is inserted in the vertical sleeve 6, and immobilized therein at a location within the interior of the bundle. The instantaneous level of neutron flux being sensed at the second ionization chamber 17a, is observed upon the indicating electrometer 20; after a very brief initial transient the indicated flux reaches a constant value substantially at equilibrium, which, upon the basis of suitable calibration, affords a direct indication of the specific neutronic reactivity of the sample. In normal position, the safety blade 14, is suspended from the electromagnet 13, and thus is retained largely removed from the tank 1; in the event of any chance supercritical excursion of the chain fission reaction, the first ionization chamber 17, through the electrometer 18, and limit relay 19, serves to de-energize the electromagnet 13, and thereby drops the safety blade 14, through the slot 16, into the tank 1, whence the voracity of its cadmium content in absorbing neutrons effectively checks the reaction.

Referring to Fig. 3, the production-line design, fundamentally similar to the Figs. 1 and 2 assembly, comprises a horizontal, elongated tank 101, of an upright, U-shaped, longitudinal cross-section, thus having a hemi-cylindrical bottom, and closed with an integral, horizontal planar cover. The two vertical, planar, extremital walls, e.g. 102, of the tank, perforated as complementary tube sheets, support a bundle of spaced, open-ended, cylindrical tubes 103, 103', again in triangular array and of a generally hexagonal periphery. The seven central tubes, e.g. 103a, 103a', are imbedded symmetrically in a removable, elongated, polyethylene stringer 104, of hexagonal cross-section, adapted to fit snugly into respective accommodating ports, e.g. 105, in each of the walls, e.g. 102, and of sufficient length to extend between and to protrude slightly from each of those walls. Axially aligned and in abutting registry with each end of the centermost tube 103a is a respective cylindrical specimen carrier sleeve 106, supported upon upright A-shaped stands 107, 107'.

One sleeve 106, along a portion of its extremity away from the centermost tube 103a, has its upper hemi-cylindrical half removed so as to provide a specimen introduction port 108. Again, a special tube 103b, of said bundle, located adjacent the polyethylene stringer 104, is adapted to accommodate a strong neutron source (not shown; basically identical with source 8 in Fig. 2). The centermost tube 103a, is provided to accommodate the specimen to be assessed (not shown), while the remaining tubes, e.g. 103, 103', are adapted to contain in the central region of their length alterable quantities of removable, right-cylindrical, fuel slugs (not shown; basically identical with fuel slugs 10, 10', in Fig. 2), again comprising aluminum-canned aluminum alloy of uranium isotopically enriched in uranium-235. The extremital portions of the fuel-containing tubes 103, 103', as well as other portions thereof not occupied by fuel slugs, accommodate loose-fitting, solid, right-cylindrical rods of polyethylene (not shown) for serving primarily to reflect the neutron flux approaching the ends of the tubes. The tank 101, is adapted to be filled with a body of ordinary water 109, for permeating the interstices of the tube bundles to serve as neutron moderator. Two vertical, planar safety sheets 110, 110', are releasably suspended from respective electromagnets 111, 111', supported upon a common superstructure frame 112, above the top of the tank 101. Each safety sheet comprises a ferromagnetic-capped, aluminum-sheathed plate of comminuted boron carbide metallurgically suspended in a matrix of aluminum, and upon release is adapted to fall by gravity through a respective slot 113, in the top of the tank 101, into the heart of the bundle. Separate ionization chambers, 114, 114', 114'', lined with boron-10 and disposed vertically within the tank near the periphery of the tube bundle, actuate instrumentation (not shown; basically similar to that schematically represented in Figs. 1 and 2), for indicating the level of neutron flux sensed, and for automatically de-energizing the electromagnets 111, 111', to check the chain fission reaction by dropping the safety sheets whenever the sensed flux level becomes excessive. As a supplementary safety feature, an open topped dump tank 115, of capacity sufficient to contain the entire body of water 109, is disposed directly below the tank 101; a quick-acting dump valve 116, in the bottom of the tank 101, affords rapid draining of all water into the dump tank 115, so as further to curb the reaction. A thick concrete radiation shield wall 117, perforated by access means including a lead shield door 118, and a removable, water-filled plug tank 119, through which one specimen carrier sleeve 106, passes, surrounds the tank 101, and associated dump tank 115, and frame 112, and is closed at the top by a shielding cover plate 120.

The operation of the Fig. 3 production-line model generally parallels that of the simpler system of Figs. 1 and 2. However, the horizontal disposition of the specimen tube 103a, with its horizontal carrier sleeves, e.g. 106, extending outward from each extremity through the shield wall 117, is particularly favorable for handling a continuous supply of specimens. Individual specimens are charged into one carrier sleeve 106, conveniently through the specimen introduction port 108, and are readily pushed as with a ramrod into the interior of the tube bundle for the analysis and then out of the other carrier sleeve at the far end of the device. Individual specimens may thus be simply charged, immobilized briefly in the interior of the assembly, and finally pushed out the far extremity in a brisk unidirectional flow. Alternatively, especially where a sizeable number of nominally identical specimens are to be scanned for rejecting occasional off-tolerance pieces, it can be feasible to pass the pieces through the assembly in a contiguous end-to-end procession, in either intermittent or continuous flow. Moreover, by virtue of the re-entrant, straight-through specimen passage, straight elongated specimens of length many times that of the tube bundle are readily examined by feeding same into end of the carrier sleeve 106, and assessing successive increments of their length in intermittent step-wise fashion; one increment approximating tube-bundle length may beneficially overlap the next to any extent appropriate for affording enhanced analytical precision and specificity. Here, too, rather than proceeding intermittently, such an elongated specimen may suitably be advanced continuously through the assembly, whereupon the indication being obtained at any time will represent the specific neutronic reactivity of whatever increment of length happens then to be fully within the tube handle. In any case, such continuous advance should be sufficiently slow that the period for displacement of a significant unit of length is relatively long as compared with the effective damping time for flux transients in the assembly. For specimens of larger or irregular girth, the entire polyethylene stringer 104, is removable from its ports, e.g. 105, in the tank 101, to afford extra space for accommodation; other similar stringers having larger or smaller sample tubes, as needed, imbedded therein are most simply substituted. The horizontal disposition of the overall bundled tubes 103, 103', simplifies alteration of the quantity of fuel in the assembly for adjusting the effective multiplication constant; fuel slugs may quickly and easily be pushed into or out of the level tubes. The resort to two safety sheets 110, 110', each independently adequate, provides an added factor of safety for the event of any malfunctioning of one, with supplemental enhancement by the feature of drainability of the body of water 109, from the vicinity of the fuel. The thick concrete radiation shielding wall 117, enables close physiological access to the assembly, and the shortness of the irradiation periods involved have permitted immediate manual handling of discharged specimens.

Data outlining two particularly preferred embodiments of subcritical assemblies, corresponding with the simple Figs. 1 and 2 arrangement and the more advanced Fig. 3 device, which have proven eminently effective in performance of the present method, are tabulated in the Tables I and II, respectively, hereinbelow.

TABLE I

*Specific embodiment of Figs. 1 and 2 assembly*

Drum:
    Material—Stainless steel
    Volume—55 gal.
    Height—Ca. 2 ft.
    Diameter—Ca. 2 ft.
Tube sheets:
    Material—Aluminum
    Bottom sheet, thickness—3/16 in.
    Top sheet, thickness—3/8 in.
Core:
    Tubes—
        Number: 80.
        Material: Aluminum
        Size: 1 in. I.D.
        Lattice array: triangular
        Spacing, bundle envelope into interior cylindrical wall of tank: nominally 10 in.
Fuel:
    Material—Alloy of U-235 and Al.
    Composition (normal)—5% U (by chem. analysis)
    Can—Aluminum
    Configuration—Solid right cylinders
    Size (normal—1 in. diam. x 12½ in. long
    Mass U-235 for criticality (normal—4 kg.
Moderant:
    Material—Light water
Specimen sleeve:
    Location—Longitudinal axis of tank
    Material—Aluminum
    Length—58 in.
Neutron source:
    Type—Polonium-beryllium
    Strength—$10^7$ neutrons per second
Safety plate:
    Material—Cadmium sheet (ca. 1/32 in.)
    Nuclear worth: $\Delta k = -3\% \, k$ (empirical)

Ionization chambers:
    Number—2
    Type—Boron-lined, gamma-compensated (Westinghouse, WL 6377)
    Voltage—+900 volts (negative lead grounded)
    Supply—3 ea. 300 volt batteries
Electrometer:
    Type—Vibrating-reed (Beckman Model V)
Limit relay:
    (Weston Sensitrol) set to open normally closed relay at 95% of full scale of electrometer.
Indicating electrometer:
    Element—Vibrating-reed; zero-suppressed (Applied Physics Laboratory Model 30)
    Indicator—Strip chart recorder (Weston Model 6700)
External shielding:
    Sides and bottom of tank—1/32 in. cadmium sheet
    Shield wall—4 in. x 8 in. x 12 in. magnetite concrete shielding blocks stacked edgewise in two layers around tank
    Radiation levels near shielding at $k = 0.982$ (empirical)

|  | Gamma, mr./hr. | Neutrons | |
|---|---|---|---|
|  |  | Fast, mrem./hr. | Slow, mrem./hr. |
| No external shielding | 460 | 420 | 40 |
| With shielding | 50 | 50 | 1 |

Flux transient damping:
    (Empirically determined period for sudden change in reactivity of $\Delta k \leqslant 0.001$ (time after insertion of specimen at which sensed flux reaches approximately [≥99%] equilibrium) for different multiplication constants, "$k$" (with sample inserted)
        For $k = 0.95$: 11 sec.
        $k = 0.98$: 20 sec.
        $k = 0.99$: 60 sec.
Sensitivity:
    Smallest discernable deviation in U-235 content of fuel-type specimen (nominally 20 gms. U-235 content): ca. 0.05 gm.

TABLE II

*Specific embodiment of Fig. 3 assembly*

Tank:
    Material—2 S aluminum plate
    Thickness—¼ in.
    Length—38⅞ in.
    Width—38¼ in.
    Height—44¼ in.
Tubes:
    Number—120
    Material—2 S aluminum
    Length—38⅞ in.
    O.D.—1.090 in.
    I.D.—1.020 in.
    Lattice array—Triangular
    Center-to-center spacing: 1.687 in. (empirically determined optimum for minimum critical mass).
    Hexagonal bundle—
        Width across flats: 18.90 in.
        Width across parts: 21.33 in.
        Planar gaps for safety plates:
            Width (perpendicular to flats): ½ in.
Fuel:
    Material—Alloy of U-235 and Al
    Composition—5% U
    Can—Al
    Configuration—Solid right cylinders
    Size—1 in. diam. x 12 in. long
    Position—Restricted to central 2 ft. of fuel tubes End inserts—Polyethylene rods
Extrapolated critical mass—4.09 kg. U-235
Mass for $k=0.99$ (no extraneous poison)—4.00 kg.
Stringer:
  Material—Polyethylene
  Tubes embodied—7
  Width across flats—4.525 in.
Moderant:
  Material—Deionized light water
  Height control—Overflow tube
  Treatment—Side stream recirculated continuously, through ion-exchange resin and filter at 3 g.p.m.
Source:
  Material—Polonium-beryllium
  Strength—Varied in use from $6.6 \times 10^7$ to $1.9 \times 10^7$ neutrons/sec.
Dump value:
  Type—Pneumatic; quick-acting
  Construction—Closure disc forced by piston in air cylinder against an eight inch diameter port
  Capacity—Drains water to midplane of bundle in 5 sec.
Safety sheets:
  Number—2
  Material—Boral (cf. U.S. Patent 2,727,996, December 20, 1955, T. Rockwell et al., for Thermal Neutrons Shield and Method for Making Same)
  Thickness—⅛″; aluminum frame edged
  Nuclear worth—

$$\frac{\Delta k}{k} = -30\%$$

Duration of free fall—0.3 sec.
  Snubbing—Moistened cellulose sponges
  Suspension—By individual electromagnets
Ionization chambers:
  Number—6
  Arrangement—Suspended inside tank, 3 on each side
  Type—Boron—10 lined
  Service—
    2 independently activate respective circuitry for each electromagnet
    4 connected in parallel; serve indicating electrometer
External shielding:
  Shield wall—Concrete wall; 2 ft. thick; 9 ft. high
  Liner—1/32 in. cadmium sheet line interior of wall
  Sliding doors—Lead 2¾ in. thick, with ports for carrier tubes
  Plugs—Water-filled sheet metal tanks, with ports for carrier tubes, 24 in. thick

*Typical multiplication increase or decrease with specimen insertion (empirical)*

Specimen 3 "Natural uranium slugs":
  Number of slugs—3
  Material—Natural uranium
  Concentration—0.71% U-235 per overall wt.
  Can—Al
  Diameter—1 in.
  Length—8 in.
  $k$ (with slugs inserted)—0.99
  $k$ (without slugs)—0.98
Specimen: "U-235 slug":
  Material—U-235 alloy with Al
  Composition—Ca. 5% U-235 by wt.
  Can—Al
  Diameter—1.005 in.
  Length—12.49 in.
  $k$ (with slug inserted)—0.990
  $k$ (without slug)—0.969
Specimen: "Li-Al slug":
  Material—Lithium-aluminum alloy
  Composition—Ca. 3.5% by wt. Li
  Can—Al
  Diameter—0.8 in.
  Length—10 in.
  $k$ (with slug inserted)—0.960
  $k$ (without slug)—0.981
Specimen "Natural uranium strip":
  Material—bare natural uranium
  Thickness—⅕ in. (approx.)
  Width—3¼ in. (approx.)
  Length—5 ft. (approx.)
  Exposure in assembly—Ca. 38 in. per step; advanced in 1 ft. increments
  $k$ (with strip inserted)—0.976
  $k$ (without strip)—0.974
Specimen "Enriched uranium strip":
  Material—Bare uranium
  Composition—1.5% by wt. U-235
  Dimensions—(same as natural uranium strip supra)
  $k$ (with strip inserted)—0.989
  $k$ (without strip)—0.974
Typical calibration (empirical):
  Standards—Single slugs of known composition
  Material—U-235 alloy with Al
  Compositions—Chemically analyzed; graduated between 4 and 8% by wt. U-235
  Cans—Al
  Diameter—1.005 in.
  Length—12.49 in.

| Wt. Percent U-235 | Indicating Electrometer Current, $10^{-8}$ amp. |
|---|---|
| 4.2 | 1.16 |
| 5.2 | 1.29 |
| 6.2 | 1.43 |
| 7.2 | 1.58 |

*Demonstrated precision (empirical)*

Specimen (as identified above):
  "Natural uranium slug" (Source: $2.9 \times 10^7$ n/sec.)—±0.001% U-235 concentration by wt.
  "U-235 slug" (Source: $3.1 \times 10^7$)—±0.01% U-235
  "Li-Al slug" (Source: $6.4 \times 10^7$)—±0.07% Li concentration by wt.
  "Natural uranium strip" (Source: $5.1 \times 10^7$)—±0.002% U-235
  "Enriched uranium strip" (Source: $5.1 \times 10^7$—±0.002% U-235

It is particularly noteworthy in Table II that the change in "$k$" attending insertion and/or removal of typical specimens from the described assembly is not unduly large as compared to the specified critical operational range for $k$. Therefore, initial adjustment of the fuel loading of the assembly will accommodate various specimens widely divergent in specific reactivity without requiring readjustment; for service in nuclear gaging of nominally identical pieces, readjustments in fuel loading should ordinarily be necessary only when shifting between specimen types of grossly different general levels of specific reactivity. Too, the manifested approximate linearity afforded in the calibration of the electrometer indications against the significant reactivity variable is particularly convenient.

Quantitative aspects may be further appreciated from the following five relationships derived, in part empirically, as characterizing the general operation:

$$N(k_{eff}, t) = C_1 e^{(k_{eff}-1) t/t_0} + C_2 \frac{S}{1-k_{eff}} \quad (1)$$

$$k_{eff} = C_3 \frac{m}{m_0} + (1 - C_3) \quad (2)$$

$$M = \frac{1}{1-k_{eff}} \quad (3)$$

$$\frac{\partial N}{\partial m} = C_2 C_3 \frac{SM^2}{m_0} \quad (4)$$

$$I = C_4 N \quad (5)$$

where:

$N$=number of neutrons produced per unit time in overall assembly (including source);
$k_{eff}$ (also "$k$")=effective multiplication constant;
$t$=time;
$l_0$=effective lifetime of neutrons
$C_1$=difference in equilibrium neutron production rates, before and after change in loading;
$C_2$, $C_3$, $C_4$=constants depending upon nature of assembly, with $C_4$ depending also upon counting geometry and efficiency;
$S$=rate of neutron emission by source;
$m$=amount of fissionable isotope in assembly;
$m_0$=total amount of fissionable isotope that would make the assembly critical;
$M$=multiplication as defined in (3);
$I$=indicated flux at ionization chamber.

Equation 1 gives the neutron production rate, following a change in loading of the assembly. The first right-hand term represents the transient and decays to zero for any $k_{eff}$ below unity, but will do so very slowly for such $k_{eff}$'s very close to unity, thus prescribing resort to low multiplication constants to avoid delay in the analytical examination. The second term is a steady-state contribution, depending merely upon source strength and $k_{eff}$. Equation 4, derived by application of the empirical (2) and definitional (3) relationships to the steady-state term in (1), gives the sensitivity; for high sensitivity a high multiplication constant ($k_{eff}$ nearly 1) is necessary. It is between these conflicting desiderata for $k_{eff}$ that the applicant has found the particular range between 0.95 and 0.995 to afford adequately short transient time simultaneously with adequately high sensitivity—as manifested in Tables I and II. Specifically, in Table I, "Flux transient damping" entry, the observed values show that $l_0$ approximates a constant, equal to approximately 0.1 second, in this range. Concerning sensitivity at the same time, the very fact of subcritical operation affords safe resort to a more compact and lighter critical mass than heretofore customary for a self-sustaining system, and thus inherently affords enhanced sensitivity in view of the inverse proportionality of sensitivity to $m_0$.

While this invention has been described with particular reference to employing heterogeneous subcritical assemblies comprising solid cylindrical fuel elements and bundles of retaining tubes therefor, performance of the instant method is inherently susceptible to wide variation. For instance, fuel elements in other configurations such as flat or arched plates may be used. Too, a homogeneous assembly comprising a solution of enriched uranium compound in light or heavy water is alternatively applicable. Instead of an internal compact source of neutrons, the sustaining neutrons supply may be received from external the assembly, e.g. by exposing one face of the assembly to the radiation emanating from a self-sustaining chain fission reactor. Moreover, while calibration of the assembly to indicate the specific neutronic reactivity in terms of equivalent content of a particular fissionable isotope or neutron-absorbing isotope has been stressed, other suitable terms, such as absorbent to fuel ratio, may also be applied. Other variations and applications of the hereinbefore disclosed method will become apparent to those skilled in the art. It is, therefore, to be understood that all matters contained in the above description and examples are illustrative only, and do not limit the scope of the present invention.

What is claimed is:

1. A method for the determination of whether the specific neutronic reactivity of a specimen object is variant from that of a standard object which comprises the non-simultaneous introduction of a standard object of known specific neutronic reactivity and a specimen object of a size, shape and composition similar to said standard object into a position in a nuclear reactive assembly of thermal neutron fissionable material and moderator having a neutron source, said assembly having an effective thermal neutron multiplication constant with one of said objects in said assembly of between about 0.95 and 0.995, exposing a neutron flux detector at a second position in said assembly to the equilibrium neutron flux levels resultant from the introduction of said objects into the assembly, and activating an indicating electrometer means operably responsive to said neutron flux detector.

2. A method as in claim 1 in which the specimen object is a nuclear fuel having a substantial content of a material fissionable by thermal neutrons.

3. A method for the determination of whether the specific neutronic reactivity of each of a multiplicity of specimen objects having a substantial content of a material fissionable by thermal neutrons is variant from that of at least one standard object of known specific neutronic reactivity and of a size, shape, and composition similar to that of said specimen objects, which comprises separately passing each said object transversely through, and briefly immobilizing in a position within, a nuclear reactive assembly of thermal neutron fissionable material and moderator, said assembly having a neutron source, and an effective thermal neutron multiplication constant with said objects in said assembly of between about 0.95 and 0.995, exposing a neutron flux detector at a second position in said assembly to the equilibrium neutron flux levels resultant from the passage of said objects through the assembly, and activating an indicating electrometer means operably responsive to said neutron flux detector.

4. A method for the determination of whether the specific neutronic reactivity of each of a multiplicity of specimen objects having a substantial content of a material fissionable by thermal neutrons is variant from that of at least one standard object of known specific neutronic reactivity and of a size, shape and composition similar to that of said specimen objects, which comprises slowly passing said objects in a unidirectional, contiguous, end-to-end procession through a nuclear reactive assembly of thermal neutrons fissionable material and moderator, said assembly having a neutron source and an effective thermal neutron multiplication constant with said objects in said assembly of between about 0.95 and 0.995, exposing a neutron flux detector at a second position in said assembly to the equilibrium neutron flux levels resultant from the passage of said objects through the assembly and activating an indicating electrometer means operably responsive to said neutron flux detector.

References Cited in the file of this patent

UNITED STATES PATENTS

| | | |
|---|---|---|
| 2,708,656 | Fermi et al. | May 17, 1955 |
| 2,768,134 | Fermi et al. | Oct. 23, 1956 |
| 2,780,595 | Fermi | Feb. 5, 1957 |
| 2,781,307 | Wigner | Feb. 12, 1957 |

OTHER REFERENCES

"Peaceful Uses of Atomic Energy," vol. 3, from the Proceeding of the International Conference on the Peaceful Uses of Atomic Energy held in Geneva 1955, published by the United Nations, New York, 1955; page 303 relied on.

Abstract 534,681, Method of Testing Materials, Enrico Fermi and Leo Szilard, filed May 8, 1944, publ. Feb. 17, 1953, Class 204–154, vol. 667, page 762 of O.G. Feb. 17, 1953. 204–154.2.